March 4, 1941.   W. D. ANDERSON ET AL   2,233,933
RELUCTANCE MOTOR
Filed May 14, 1938
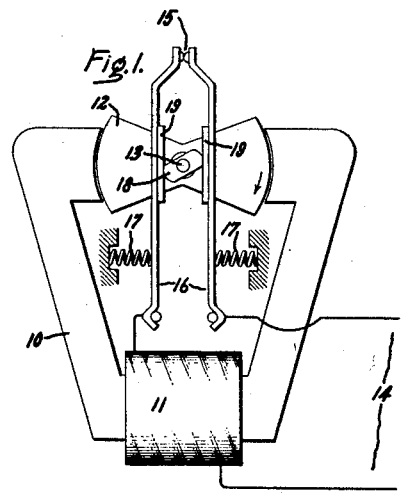
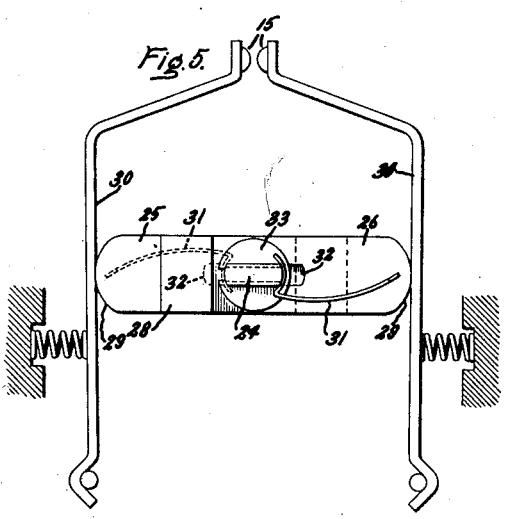
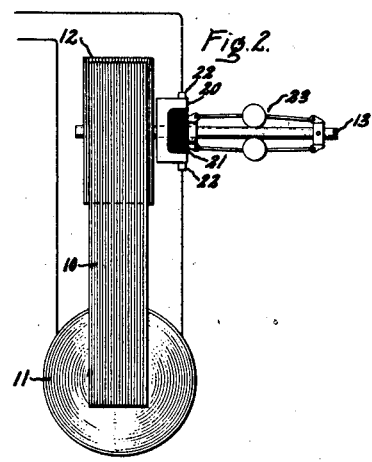
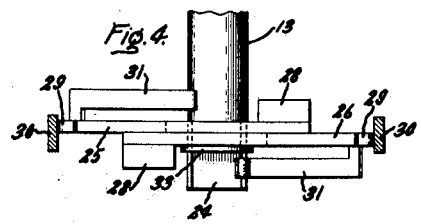
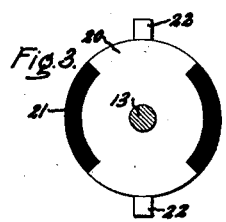
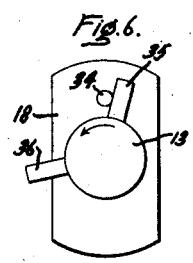
Inventors:
Warren D. Anderson,
Leonard W. Cook,
by Harry E. Dunham
Their Attorney.

Patented Mar. 4, 1941

2,233,933

UNITED STATES PATENT OFFICE 2,233,933

RELUCTANCE MOTOR

Warren D. Anderson, Stamford, and Leonard W. Cook, Stratford, Conn., assignors to General Electric Company, a corporation of New York Application May 14, 1938, Serial No. 207,962

4 Claims. (Cl. 172—36)

Our invention relates to reluctance motors of the type which may be operated on either direct or alternating current. The object of our invention is to provide a universal reluctance motor which will operate as a synchronous alternating current motor without arcing contacts.

The features of our invention which are believed to be novel and patentable will be pointed in the claims appended hereto. For a better understanding of our invention, reference is made in the following description to the accompanying drawing in which Fig. 1 represents a simple reluctance motor which may be considered to represent the prior art and is included in order that our improvement may be more readily explained; Fig. 2 represents an embodiment of our invention provided with speed responsive means to eliminate the contact device from the motor circuit when the motor comes up to speed. Fig. 3 is an end view of the contact commutator of Fig. 2. Figs. 4 and 5 are plan and end views respectively of another form of speed responsive contact mechanism for accomplishing the same purpose as in the device of Fig. 2; and Fig. 6 shows a motor reversing feature.

Referring to Fig. 1, we have represented a stationary two-pole stator structure having the magnetic yoke 10 and an energizing winding 11. The rotor consists of a two-pole magnetic rotor 12 secured on a shaft 13. The winding 11 is energized from a source of supply 14 through contacts 15 and the pivoted contact arms 16. The contacts at 15 are normally biased to a closed position by the springs 17. On shaft 13 is a two-lobed cam 18, the cam lobes thereon being spaced 180 degrees apart for a two-pole motor. This cam is arranged to separate the arms 16 and their contacts 15 twice per revolution of the shaft during certain angular positions of the rotor.

The cam 18 may be of insulating material or strip 19 of insulating material may be secured on arms 16 as rubbing surfaces for the cam 18. Hence, there is no circuit between the arms at the cam.

In Fig. 1 the angular position of the cam with respect to the pole pieces of the rotor is set for clockwise rotation. It is seen that, assuming clockwise rotation, the circuit of winding 11 is closed at contacts 15 as the rotor pole pieces approach the stator pole pieces, but the cricuit is opened as the rotor pole pieces move into alignment with the stator pole pieces.

If, in Fig. 1, winding 11 were connected directly to an alternating current circuit and the cam operated contact device were eliminated, we would have a normal single phase non-self-starting synchronous reluctance motor. Such a motor can be started with some difficulty by giving the rotor a spin to synchronize its rate of rotation with the A. C. flux pulsations and shifting the phase position of the rotor to align with such flux pulsations every half revolution. After this condition has been established, such a motor will continue to run synchronously at light loads. The addition of the synchronous contact device to the motor as in Fig. 1 may not materially change the synchronous reluctance motor operation just referred to because, assuming synchronous operation and a correct load, the contact device may open the motor circuit during that portion of the alternating current cycle when the current is small and is passing through zero value and to close it when the current rises toward maximum value in opposite directions. Thus, at synchronous speed with alternating current excitation and operating in the proper direction of rotation with a correct load, the motor functions about the same with or without the cam operated contact device although the available torque is greater with the continuously closed circuit.

The motor with the contact device can, however, be started much more easily with alternating current excitation than the reluctance motor without such contact device and moreover, will operate on direct current at various speeds.

The operation of the motor of Fig. 1 during starting and below synchronous speed is substantially the same for either direct or alternating current excitation. If we assume the motor of Fig. 1 is energized by direct current, its operation may be considered to resemble the operation of a reluctance motor without the contact device if it were energized by an alternating current having a frequency proportional to the motor speed of one cycle per revolution of the motor. That is, the contact device allows two current impulses to traverse the winding 11 for each complete revolution and these current impulses are so timed by the contact device that they occur at the proper times to produce forward torque of the motor rotor. These torque impulses occur over about 90 degrees rotation of the rotor between approximately maximum and minimum reluctance positions with respect to the stator pole pieces. Thus, in Fig. 1 the contacts have been closed for about 90 degrees of rotation of the rotor and the rotor having arrived at the minimum reluctance position the contacts will open for the next 90 degrees of rotation.

Thus, the motor will operate on direct current and will run at a speed which depends upon the load. If the rotor is properly positioned at standstill where the contacts are closed, the motor will start and run up to speed. If positioned at standstill where the contacts are open, it will not start but may be readily started by giving the rotor a slight spin in the desired direction. This hand starting operation does not require the exacting speed conditions which are necessary in starting and synchronizing the ordinary non-self-starting synchronous reluctance motor. The spinning operation necessary is only that which will carry the rotor through the dead quadrant and, of course, may be considerably in excess of this amount. Hence, the starting of this motor is a simple and easy matter. At starting and at speeds below synchronism where several cycles of alternating current would occur per rotation of the rotor through 90 degrees are, the starting and operation of the motor is substantially the same for either A. C. or D. C. excitation. On A. C. operation, the motor has its maximum torque at synchronous speed. It can also be made to operate above synchronous speed at light load. If loaded with a load that varies with speed but which exceeds that which the motor will carry at or above synchronous speed, the motor will operate below synchronous speed where its torque balances the load. On D. C. operation, the motor speed varies with load. Its torque is generally higher with D. C. than with A. C. excitation below synchronous speed assuming the same effective voltage.

The excitation may be made to taper off so as to limit the no load D. C. speed depending upon the natural period of vibration of the contact arms 16. For example, the contact arms as biased by springs 17 may be designed and adjusted to exactly follow the cam 18 at a given desired speed, but for higher speeds the arms may not be able to return to close the contacts as quick as the cam would permit. This will progressively decrease the excitation of the motor as the speed tends to rise above this point and is an expedient, which so far as known has not been used heretofore on this type of motor, that may be used to quite definitely limit the no-load speed of the motor. Where both D. C. and A. C. operation is expected, it will generally be desirable to have such natural rate of vibration of the contact mechanism occur at synchronous speed. This will also tend to minimize noise and wear of the contact mechanism at the normal operating speed of the device.

For most purposes a considerable improvement may be made in the device of Fig. 1 in the manner exemplified in Figs. 2, 3, 4, and 5.

In Fig. 2 I have shown an edge-wise view of a motor which so far as the stator and rotor is concerned may be exactly like that shown in Fig. 1. It is provided with a different form of contact device which, nevertheless, performs the same function as the contact device of Fig. 1 for starting and speeds below synchronism. This comprises a conducting drum 20 having insulating segments 21 in its outer end on opposite diameters as best shown in the end view of Fig. 3 and a pair of brushes 22 bearing on opposite diameters of the drum. This contact device is connected in the motor circuit. The drum 20 is splined on the motor shaft and rotates therewith and the brushes are stationary. Hence, when the rotor rotates, the motor circuit is interrupted twice per revolution of the rotor, each interruption being for about ¼ revolution. The brushes are to be adjusted about the drum to such a position as to make and break the motor circuit as the rotor poles arrive at about the maximum and minimum reluctance positions between the stator poles for a given direction of rotation as explained in connection with Fig. 1. Then it will be evident that the direction of rotor rotation may be changed by shifting the brushes about the drum about 90 degrees, just as in Fig. 1 we could change the direction of rotation by shifting cam 18 on shaft 13 around about 90 degrees. The contact drum 20 of Fig. 2 is arranged to be moved endwise of the motor shaft with respect to the brushes by a centrifugal speed responsive device 23. At starting and at speeds below synchronism the operation of this motor and contact device is the same in principle as the apparatus of Fig. 1. At approximately synchronous speed, the speed responsive device 23 has pulled the drum outward along the shaft so that the brushes 22 bear on the continuous conducting inner end portion of the drum 20. Thus, at synchronous speed the motor circuit is closed continuously. The circuit interrupting device should be rendered ineffective between the pull in and synchronous speeds.

It will be evident that at starting and below synchronous speed, while the brushes 22 bear on the non-continuous part of the drum 20, the operation of the motor of Fig. 2 is the same as that of Fig. 1 for either A. C. or D. C. excitation. With D. C. excitation, when the motor of Fig. 2 approaches synchronous speed and the winding 11 starts to be energized more or less continuously, the torque drops and definitely limits the speed to a value just below synchronism. This will be understood when it is realized that the motor would have no resultant torque in a given direction if energized continuously with direct current. In such a case, the motor would have two positive and two negative torque pulsations per revolution, the negative and positive torques being equal. The insulating segments 21 may be given a tapered shape at their inner ends as indicated in the segment seen in Fig. 2 so that this condition of zero resultant torque with D. C. excitation will be approached more or less gradually as the speed increases. This will prevent fluctuations in speed and allow the motor to rise to a steady speed where the positive resultant torque is just sufficient to maintain this speed for a given load.

Fig. 4 represents a plan view and Fig. 5 an end view of a speed responsive governor for accomplishing the same results as the governing mechanism of Fig. 2. In Figs. 4 and 5, 13 represents the motor shaft. It has opposite sides cut away at one point to leave an oblong shaped section 24. Then we provide a pair of flat members 25 and 26 made of insulating material such as Bakelite or horn fiber and having slots 32 cut therein as shown so as to fit on the oblong section 24 of the shaft with a sliding fit. That is, members 25 and 26 may slide on shaft 24 in radial directions between the limits of the slot ends cut in these members.

Any suitable means such as the washer 33 and the uncut section of shaft 13 may be used to prevent axial displacement of members 25 and 26 along the shaft while leaving them sufficiently free to slide in radial directions on the shaft. The short radial arms of these members 25 and 26 extend in opposite directions and are provided with weights 28. The longer radial arms of these members have rounded ends 29 and when extended can come in contact with the inner surfaces of a pair of contact arms 30 substantially equivalent to the contact arms 16 of Fig. 1 and force these switch contact arms apart to open the motor circuit at contacts 15. Members 25 and 26 are urged to the extended position just mentioned, and shown in Fig. 5 by column springs 31, which column springs have one end secured to the longer arms of members 25 and 26 respectively and the other ends bearing against the motor shaft. Hence, these column springs tend to keep the members 25 and 26 in the extended positions shown in Fig. 5 with the shaft section 24 against the inner ends of slots 32.

This is the normal condition of this device when the motor is stationary and operating at speeds below synchronism. The mechanism comprises a centrifugal governor by reason of the fact that as the motor speed increases, the tendency of the weights 28 to move away from the shaft due to centrifugal force overcomes the force exerted by the column springs 31 and members 25 and 26 start to slide so as to move their ends 29 inwardly towards the shaft. The column springs bend and when synchronous speed is reached, the rounded ends of members 25 and 26 no longer strike contact arms 30. Hence, contacts at 15 remain closed. Contacts 15 are connected in the motor circuit as in Fig. 1. At starting speeds the contacts are opened twice per revolution by members 25 and 26, and for approximately ¼ revolution and at the proper times to cause motor rotation in a selected direction, the motor operation on D. C. and A. C. being in other respects similar to that previously described. As synchronous speed is approached, the speed responsive device functions to shorten the periods of motor circuit interruption and at synchronous speed does not move contacts 15 from their closed condition. The movement of the parts of this governor device can be made very critical and definite at a given speed as a result of the increasing radius of gyration of weights 28 and the negative force-distance characteristic of the column springs 31. The operation of the motor when equipped with this governor is the same in principle as that explained in connection with Fig. 2.

The provision of a governor to change the operation of the contact device as explained in connection with Figs. 2 to 5 inclusive has important advantages. The noise and vibration incident to the operation of the contact mechanism of Fig. 1 is continuous when the motor is in operation. Likewise it is a source of radio noise interference when in operation.

The scheme of Fig. 2 makes little noise at any time. The scheme of Figs. 4 and 5 is noiseless when up to synchronous speed. On A. C. operation radio interference is absent when the devices of Figs. 2 to 5 are in synchronous operation. Contact wear and necessary adjustment is materially less than with the device of Fig. 1. Another important advantage of the motor with the governing device is that when operating as an A. C. motor it will pull up and into synchronism without outside assistance. While the motor of Fig. 1 is more easily synchronized than the common non-self-starting synchronous motor, it can not be depended upon to pull into synchronism by itself due to the low pull in torque developed by this type of motor construction when the circuit is open at least half of the time. However, when the governing device is used and it is properly adjusted with respect to the synchronous speed, the motor will be self-synchronizing because as synchronous pull in speed is reached, the motor circuit is closed continuously and at such speed the motor has the pull torque which the ordinary non-self-starting synchronous motor has at synchronous speed.

In explaining the invention, we have specified that the motor circuit should be opened by the contact device as the rotor approaches a minimum reluctance position and to be closed as the rotor approaches a maximum reluctance position. The expression "approaches" as thus used is a relative term because the most satisfactory times for opening and closing the motor circuit will vary somewhat depending upon the inductive impedance of the motor circuit and the lag of the current changes in such circuit. Provision may be made to adjust the rotary position of the contact operating device where desirable and this is possible in Fig. 2 by shifting the brushes 22.

Where it is desirable that the motor be easily reversible, we may provide an expedient of the character represented in Fig. 6. Here the two-lobed cam 18 such as is found in Fig. 1 is sufficiently free on the motor shaft 13 to turn thereon. The cam contains a stop pin 34 which cooperates with spaced stop pins 35 and 36 on the shaft. This expedient is to correctly position the cam for opposite directions of motor rotation. In Fig. 6 the pin 34 rests against pin 35 and positions the cam for counterclockwise motor operation. If now the shaft be given a spin in a clockwise direction, the cam will first strike the contact arms or pieces 19, Fig. 1, but before it can perform any cam action it must be turned to rest against stop pin 36 which correctly positions it for clockwise motor rotation. Thus, the mere manual spinning action to start the motor shifts the cam for operation in the selected direction of rotation.

In the foregoing description, only the two-pole motor has been described, but it will be evident that the invention is not confined to a two-pole motor and contact arrangement.

In accordance with the provisions of the patent statutes, we have described the principle of operation of our invention together with the apparatus which we now consider to represent the best embodiment thereof but we desire to have it understood that the apparatus shown is only illustrative and that the invention may be carried out by other means.

What we claim as new and desire to secure by Letters Patent of the United States is:

1. A universal reluctance motor comprising a salient pole magnetic stator provided with an energizing winding, a salient pole magnetic rotor for cooperating with the salient pole field member, a contact device connected in series relation with said energizing winding, means operated by rotation of said rotor for closing and opening said contact device to cause flux pulsations between the stator pole pieces in timed relation with rotation of the salient pole rotor between substantially maximum and minimum reluctance positions with respect to the stator pole pieces when rotating in a given direction, and a centrifugal governor mechanism driven by said motor and acting to maintain the motor circuit closed above a predetermined motor speed.

2. A reluctance motor having stator and rotor magnetic members provided with cooperating salient pole pieces, a winding for energizing said motor, a normally biased closed contact device in series with said winding, means operated by said motor for opening said contacts in timed relation with each arrival of its rotor to substantially a minimum reluctance position between the stator pole pieces when rotating in a given direction of rotation, and means responsive to the speed of said motor for rendering said contact opening device ineffective at substantially a predetermined speed whereby said contacts remain closed above such speed.

3. A synchronous reluctance motor adapted for energization by alternating currents comprising stator and rotor magnetic members provided with cooperating salient pole pieces, an energizing winding for said motor, a switch mechanism in series with said winding, resilient means for biasing said switch to a closed condition, means driven by said motor for opening said switch in timed relation with the speed of the motor to produce rotor accelerating torque flux pulsations between the stator pole pieces which are synchronous with speed of rotation of said rotor at speeds below the synchronous speed thereof, said last mentioned means including parts which act as a centrifugal governor and which serve to render said means ineffective to open said switch when the normal synchronous operating sped of said motor is reached.

4. A reluctance motor comprising stator and rotor magnetic members provided with cooperating salient pole pieces, an energizing winding on the stator, a switch in series relation with said winding biased to a closed position, a centrifugal governor device on the shaft of said motor having parts which, when the shaft is rotated below a predetermined speed, strike against said switch and cause it to open during selected portions of each revolution of said shaft, the number of such switch opennig operations per revolution of the shaft being the same as the number of salient poles on the rotor, said switching operations serving to cause rotor accelerating torque flux pulsations between the stator pole pieces, said centrifugal governor device parts moving to positions where they do not strike against said switch when the speed of said shaft reaches a predetermined value.

WARREN D. ANDERSON.
LEONARD W. COOK.